SUBSCRIPTION-TELEVISION AUDIO-RECEIVING SYSTEM

Filed June 13, 1961

WASSON QUAN
RICHARD C. CARDIN, JR.
INVENTORS.

BY Lyon & Lyon
ATTORNEYS.

3,187,091

SUBSCRIPTION-TELEVISION AUDIO-RECEIVING SYSTEM

Wasson Quan and Richard C. Cardin, Jr., Los Angeles, Calif., assignors to Paramount Pictures Corporation, New York, N.Y., a corporation of New York Filed June 13, 1961, Ser. No. 116,728
3 Claims. (Cl. 178—5.1)

Figure 2:
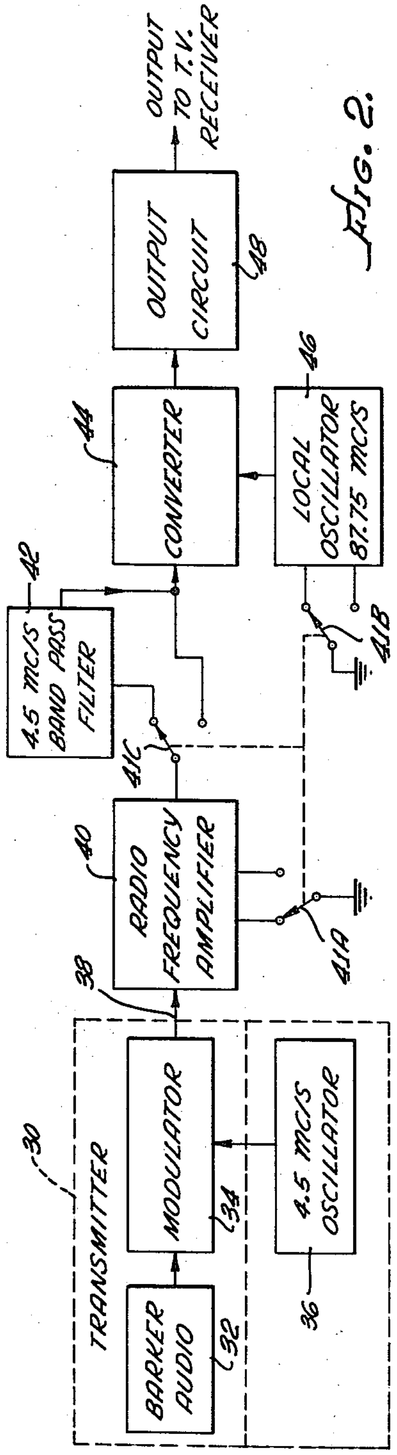

This invention relates to subscription-television systems and, more particularly, to an improvement in audio-receiving circuits employed in subscription television.

Present-day commercial television receivers employ the intercarrier method of sound reception. In this method, both picture and sound IF signals are amplified in all the picture IF stages and are passed through the picture second detector. The second detector produces in its output a 4.5 mc. signal, which is the beat frequency between the picture and sound IF carriers, commonly known as the intercarrier signal. This intercarrier signal arises from two carriers, one amplitude-modulated and the other frequency-modulated. The deviation of the frequency-modulation component is identical to that of the sound carrier, and, accordingly, by passing this intercarrier signal through the usual limiters and detectors, the frequency-modulation components are converted into the desired audio-frequency components, and the amplitude modulation of the intercarrier signal is prevented from affecting the audio-signal components. It would therefore appear that, in order to reproduce audio signals, two carrier signals are required.

In an application for a Subscription-Television System, Serial No. 77,184, filed December 20, 1960, by Carl A. S. Akrell, now U.S. Patent No. 3,104,280, which is assigned to a common assignee, there is described a closed-circuit subscription-television system. In this system, the transmitter sends to the receiver video program signals, audio program signals, control signals which include pricing information, recording information, barker audio signals, and a pilot carrier signal. At a subscriber receiver, there is provided an attachment which utilizes the pilot carrier signal and the control signals for establishing the price which must be paid for viewing the program. Upon payment of this price, the output of the local oscillator is modulated by the video and audio program signals so that they appear on a carrier which can be applied to the antenna terminals of the receiver. The receiver can then process these signals exactly in the manner of the usual television signals received by its antenna.

The barker audio signals constitute a source of information concerning the merits of the program for which payment is being sought, as well as any other information of interest to the subscriber. Since the barker audio signals, which are transmitted as frequency-modulated signals, do not accompany a video carrier, the problem is presented as to how to enable a commercial television receiver which uses intercarrier sound to reproduce these barker signals without such additional carrier being provided. In the Akrell system mentioned previously, the pilot carrier serves this function. It together with the barker signals which are frequency-modulated on a carrier are fed to the television receiver, which can then process these signals in the manner of audio signals which usually accompany any video broadcast.

An object of this invention is the provision of an arrangement for enabling a receiver in a subscription-television system to reproduce audio signals from frequency-modulated signals, without the necessity of transmitting two carriers required for deriving audio signals in the intercarrier sound system of the receiver.

Another object of this invention is the provision of a novel arrangement for processing audio signals, frequency-modulated on a carrier, in a subscription-television system prior to their being introduced into the subscriber receiver, so that they may be reproduced, either by a receiver having an intercarrier sound system or by a receiver which has a double IF system.

Yet another object of this invention is the provision of a novel and simple arrangement for processing frequency-modulated audio signals in an attachment for a television receiver in a manner so that the receiver may reproduce these signals, regardless of whether or not another carrier has been transmitted therewith.

In a subscription-television system of the type described and claimed in the Akrell application, a local oscillator is provided in the receiver attachment for the purpose of converting the carrier on which the program video and program audio are transmitted to a frequency which can be processed by the standard commercial television receiver. This occurs when proper payment has been made for the program which is desired to be viewed. In accordance with this invention, it has been found that by transmitting the barker audio as a frequency modulation on a carrier having a frequency of 4.5 mc., with a maximum deviation of ±25 kc., the signal can be processed in the same converter as is employed to process the program video and audio, where it is mixed with the output of the local oscillator. The output of the converter comprises two signals, one of these being a new carrier which carries the FM audio modulation and the other being the unmodulated oscillator output. The intercarrier sound system of the receiver can then process these signals in the same manner as the normal intercarrier sound signals, and the receiver will reproduce the barker audio. Receivers of the older variety, which employ two separate IF strips, have no difficulty in reproducing the barker audio signals, either.

Figure 1:
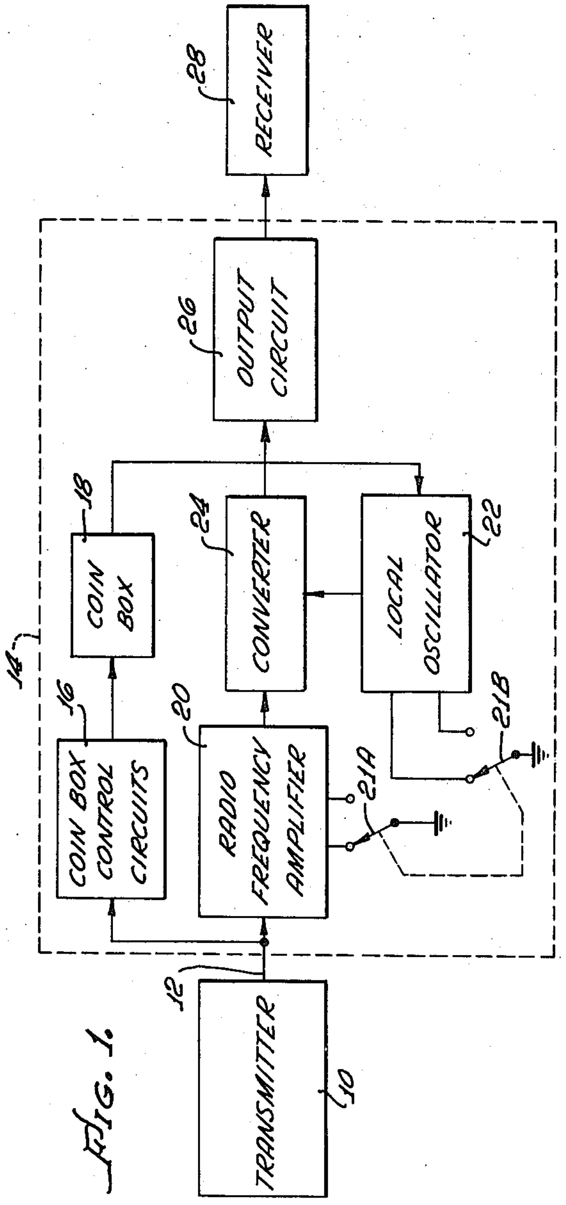

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of a subscription-television system of the type with which this invention functions, which is shown in order to afford an understanding of this invention; and FIGURE 2 is a block diagram illustrating an embodiment of this invention.

Referring now to FIGURE 1, a closed-circuit subscription-television system of the general type described in the previously mentioned application to Akrell includes a transmitter 10, which transmits program video and program audio on a nonstandard carrier—that is, one which cannot be processed by the usual commercial television receiver. In addition, the transmitter transmits pricing signals for enabling a price to be set up at a subscriber's receiver indicative of the amount required to be paid to view the program. In addition, the transmitted will transmit a barked audio signal which is frequency modulated on a carrier located, for example, at 4.315 mc./s. In addition, a pilot carrier is transmitted in order to enable the barker audio signals to be reproduced by the receiver. The pilot carrier may be at a frequency of, for example, 8.815 mc./s. and has no modulation.

The transmitter 10 is connected over a line 12 to the subscriber receivers, each of which will have an attachment 14, which includes the apparatus shown within the dotted rectangle. Such attachments will include a coinbox control circuit 16, which has the necessary circuitry for separating the pricing signals from the other signals being received and for applying them to a coinbox 18, whereby a price for viewing the program is established. An RF amplifier 20 is connected to the line.

A selector switch, having separate switching decks 21A, 21B, simultaneously tunes the RF amplifier 20 and the local oscillator 22. The selector switch decks 21A and 21B in the position shown will enable the barker and pilot carrier signals to pass through the RF amplifier and will tune the local oscillator to a frequency such as 86.065 mc./s.

A converter 24 receives the output of the RF amplifier 20 and the output of the local oscillator 22. This converter can convert the pilot carrier to a frequency of 77.25 mc./s. and the barker carrier to a frequency of 81.75 mc./s. These signals are then applied to an output circuit 26, which couples them to the antenna terminals of the receiver 28, which can then process these signals in the normal manner, whereby barker audio may be heard by a subscriber.

When the selector switches 21A, 21B are connected to the other position shown in the drawings, the RF amplifier is tuned to receive the program video and program audio signals. The local oscillator 22 is tuned to a frequency for converting the video and audio carriers to a frequency which the receiver 28 can suitably process. However, the local oscillator is not permitted to oscillate at this time until the coinbox 18 has received payment of the price demanded. At this time, it enables the local oscillator 22 to commence oscillation. The converter 24 will then process the video and audio program signals, apply them to the output circuit 26, which, in turn, properly couples them to the receiver 28 to be reproduced.

In accordance with this invention, no other carrier need be sent by the transmitter in order to enable the frequency-modulated barker audio signals to be reproduced at the receiver. Instead, as shown in FIGURE 2, at the transmitter 30, barker audio from a source 32 is applied to a modulator 34 to frequency modulate the output of a 4.5 mc./s. oscillator 36. This carrier is distributed to subscriber receivers over a line 38.

At each receiver, there is an attachment which is identical with the one represented in FIGURE 1, the difference being only in the addition of a 4.5 mc. filter, and the tuning of the circuits for handling the barker structure shown in FIGURE 1, which is not essential to an understanding of the invention and is omitted in FIGURE 2. When information with respect to a program is desired, the selector switch 41A, 41B, 41C is turned to the position shown in the drawing. The other position of the switch is used for receiving a program, as previously described. The radio-frequency amplifier 40 amplifies the 4.5 mc./s. frequency-modulated carrier signal received over the line 38. Switch section 41C in the position shown connects the output of the RF amplifier 42 to a 4.5 mc./s. bandpass filter 42; in its other position, the filter 42 is bypassed and the output of the RF amplfier is connected directly to the converter 44.

The output of the bandpass filter 42, which is the 4.5 mc. modulated carrier, is connected to a converter 44. The local oscillator 46 this time is tuned to a frequency such as 87.75 mc./s. The output of the local oscillator is applied to the converter 44. The converter then converts the 4.5 mc. carrier to a frequency of 83.25 mc., which falls within the pass band of channel 6.

The amplitude of the local oscillator 46 is set at a value such that the amplitude of the unmodulated carrier which passes through the converter 34 is larger than the amplitude of the 83.25 mc. converted frequency. Thus, the output circuit 48 will have applied to it an unmodulated carrier of 87.75 mc. and a frequency-modulated carrier of 83.25 mc. These two frequencies are then applied to the input circuits of the television receiver.

The output of the video detector of a television receiver will contain a 4.5 mc. frequency-modulated carrier. This is the intercarrier signal frequency to which the circuits of the receiver can respond in order to demodulate this signal of the information carried thereon. It will therefore be seen that the barker audio, which contains program information, may be produced at the television receiver by just transmitting a frequency-modulated carrier at 4.5 mc./s. Since a carrier frequency is required in any event, no additional equipment is required at the transmitter. Also, a local oscillator is required at the receiver attachment in any event, so, aside from an inexpensive 4.5 mc./s. bandpass filter, nothing further is required at the receiver. In addition to the advantage in eliminating the requirement for an additional carrier, another advantage is that the local oscillator may drift as much as $\pm.25$ mc./s., but the 4.5 mc./s. separation required for intercarrier detection will always be maintained. Furthermore, with this invention, less bandwidth is required for transmitting a subscription-television program over a line. This is an important factor where several subscription-television programs are sought to be transmitted.

From the foregoing description, it should be appreciated that there has been described an arrangement for a closed-circuit subscription-television system wherein no second carrier signal is sent by the transmitter in order to achieve reproduction of the audio signals in an intercarrier sound system. By tuning the local oscillator to oscillate at a frequency which will place the audio carrier within any one of the regular television channels and adjusting the carrier amplitude, a receiver can process the signals in a normal manner. It should be appreciated that the examples of frequencies given are by way of illustration, and not by way of restriction.

We claim:

1. In a subscription-television system of the type wherein a transmitter transmits program video and audio signals on a carrier which is not suited for processing by a receiver to subscriber receivers having attachments including a local oscillator and a converter for converting the nonstandard program and audio carrier to a standard video and audio carrier which can be processed by said receiver, the improvement comprising transmitting audio signals modulated on a 4.5 mc. carrier from said transmitter to said subscriber receivers, tuning said local oscillator to a frequency such that a carrier at a frequency 4.5 mc. less than said local oscillator frequency together with said local oscillator frequency can be processed by the intercarrier sound circuits of said receiver, mixing said local oscillator output together with said 4.5 mc. frequency-modulated signals in said converter to derive an output therefrom comprising said unmodulated local oscillator signals and a frequency-modulated carrier at 4.5 mc. frequency less than the frequency of said local oscillator signals, said local oscillator having its amplitude adjusted to insure that the unmodulated carrier output of said converter has an amplitude greater than the frequency-modulated carrier output of said converter, and applying said converter output to said receiver whereby it is enabled to reproduce said audio signals.

2. A subscription-television system comprising a transmitter having means for generating audio signals, means for generating a carrier having a frequency of 4.5 mc./s., means for frequency modulating said audio signals on said carrier, a receiver having an intercarrier sound-demodulating system, means for transmitting said frequency-modulated carrier to said receiver, means at said receiver for generating a local unmodulated carrier having a frequency which, when combined with a frequency-modulated carrier having a frequency which is 4.5 mc./s. different, can be processed by said receiver intercarrier sound system, means for mixing said frequency-modulated carrier and said local carrier, and means for applying said means for mixing output to said receiver intercarrier sound-demodulating system.

3. In a subscription television system of the type wherein a transmitter transmits program audio and program video signals on a first non-standard carrier and second audio signals on a 4.5 megacycle carrier to a subscriber having a converter connected to his television receiver for enabling said receiver to intelligibly process said second audio signals in the absence of payment by said subscriber, and for enabling said converter to convert said program video and program audio signals to a form whereby said receiver may intelligibly process them upon payment by said subscriber, the improvement in said converter comprising an input terminal to which said program video, said program audio and said second audio modulated upon a 4.5 megacycle carrier is applied, oscillator means in said converter for generating a local unmodulated carrier having a frequency which when combined with a frequency modulated carrier having a frequency which is 4.5 megacycles per second difference, can be processed by said receiver inter-carrier sound system, means for mixing said 4.5 megacycle frequency modulated carrier and said local carrier to produce an output comprising said unmodulated local oscillator frequency and a second frequency modulated carrier having an unmodulated frequency which is 4.5 megacycles below said unmodulated carrier, a 4.5 megacycle band pass filter connected between said input terminal and said means for mixing, means for applying output from said local oscillator to said means for mixing, and means for applying the output of said means for mixing to said receiver inter-carrier sound demodulating system.

References Cited by the Examiner

UNITED STATES PATENTS 2,875,274 2/59 Farr ------------------ 178—5.8

DAVID G. REDINBAUGH, *Primary Examiner.*

STEPHEN W. CAPELLI, *Examiner.*